July 5, 1966 G. BROJA ETAL 3,259,474
PROCESS FOR THE PRODUCTION OF ALKALI METAL BOROHYDRIDES
Filed Oct. 4, 1960
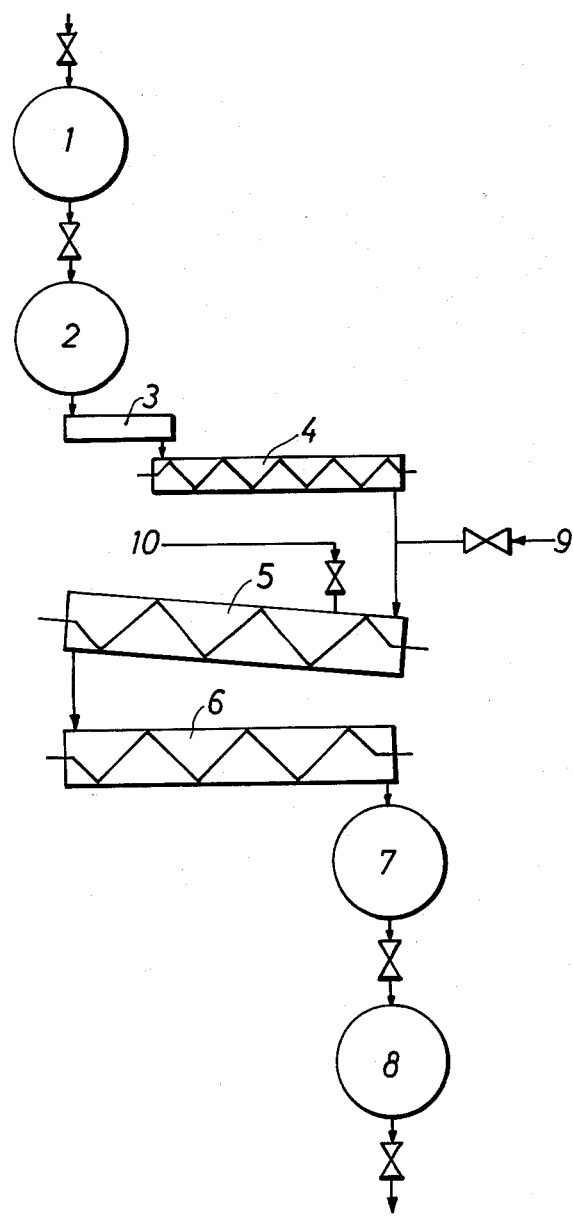
INVENTORS:
GERMAN BROJA, WERNER SCHABACHER.
BY
*Burgess Dinklage & Sprung*
ATTORNEYS

United States Patent Office 3,259,474
Patented July 5, 1966

3,259,474
PROCESS FOR THE PRODUCTION OF ALKALI METAL BOROHYDRIDES
German Broja, Leverkusen, and Werner Schabacher, Cologne-Mulheim, Germany, assignors to Farbenfabriken Bayer Aktiengesellschaft, Leverkusen, Germany, a corporation of Germany
Filed Oct. 4, 1960, Ser. No. 60,331
Claims priority, application Germany, Oct. 6, 1959, F 29,546
2 Claims. (Cl. 23—361)

The invention relates to the production of alkali metal borohydrides by reduction of boron-oxygen compounds.

It is known to react mixtures and compounds of boron oxide and alkali metal oxide in the presence of silicon dioxide such as quartz sand, with hydrogen and alkali metal or alkali metal hydride by heating to temperatures above 100° C. to form alkali metal borohydride.

For this purpose there is used, for example, dehydrated borax in admixture with quartz sand or melted with quartz sand to form sodium borosilicate, the sodium borohydride being thus obtained for example according to the equation:

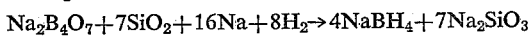

$$Na_2B_4O_7 + 7SiO_2 + 16Na + 8H_2 \rightarrow 4NaBH_4 + 7Na_2SiO_3$$

With relatively small amounts, i.e., up to about 60 kg. of reaction mixture, this reaction can be carried out in steps simply by placing the reaction components together in pressure apparatus fitted with stirrer and external heating. In the case of larger quantities it is not possible, however, to proceed in the same manner, since the temperature can no longer be controlled: the formation of sodium hydride as well as the formation of sodium borohydride are strongly exothermic; if 50 kg. of reaction material are completely reacted according to the above reaction scheme, about 25,000 kcal. have to be led off. Now the reaction mixture has first to be heated to the reaction temperature which amounts to at least 200° C. for the formation of sodium hydride and to at least 350° C. for the formation of sodium borohydride. If the large and rapidly evolving quantities of heat cannot be removed immediately and the reaction mass is thus overheated, the result will be decomposition of the reaction products with a substantial loss in yield. On the other hand, the temperature which is preferably between 420 and 450° C. should not fall below 400° C., since otherwise the reaction product is not completely reacted and, according to experience, contains sodium hydride rendering it hygroscopic and pyrophoric. Also, the temperature should, if possible, not fall below 420° C., in order to enable the product to be withdrawn in the form of small granules and to prevent wear of movable parts of the apparatus; at substantially lower temperature the product hardens to form obstructive pieces.

According to the invention the reaction is carried out continuously in several steps so that in the first step the alkali metal borate in admixture or melted with silicon dioxide is heated without an alkali metal such as sodium, potassium, lithium, etc., to more than 200° C., preferably to about 350° C., and in the second step liquid alkali metal is sprayed into the mixture under a hydrogen stream having an excess pressure of 2–5, preferably 4 atmospheres, while the mixture is kept at temperatures between 350 and 400° C. by cooling so that at least part of the mixture, according to experience usually 50%, is reacted to form the borohydride and the whole of any remaining alkali metal is reacted to form alkali metal hydride. As a rule, i.e., if the reaction mixture is not already completely reacted, it is heated again in a third step under a hydrogen stream, preferably to temperatures between 420 and 450° C. until the formation of the borohydrides is completed. With regard to the apparatus, it is usually advantageous to extend the hydrogen atmosphere also over the chamber of first step serving for pre-heating.

Moreover, it has proved to be advantageous in the course of the invention to use mixtures of alkali metal borate and quartz in a certain granulation so that the boron compound is ground as fine as possible, in any case to a grain size of less than 500 microns, preferably less than 300 microns, whilst the size of the quartz grains should not lie substantially below 100 microns, preferably between 200 and 400 microns. If the quartz is employed in too fine a granulation, particularly if finer than 60 microns, the reaction does not yield alkali metal silicate but a brown mass chiefly containing finely divided silicate instead of borohydride.

Due to the measures described above, it is now possible to produce alkali metal borohydride continuously in worm apparatus. For safe operation, however, a simple worm will suffice only in the first step during preheating; for the reaction itself, it is more advantageous to use the known double paddle worms as the only means of achieving a thorough mixing of the reaction mass and, due to the self-cleaning effect of these devices, of preventing lasting agglutinations and incrustations.

The liquid alkali metal, e.g., sodium to be added to the mixture, pre-heated in the first step, can be only introduced in the vicinity of the inlet to the second step, or the flow of the alkali metal, e.g., sodium can be distributed over several points along the double worm device, in order to facilitate the control of temperature. It is moreover advantageous to arrange the worm at a slight angle to the horizontal; the mixing is thus further improved, a larger filling volume is obtained and any unreacted alkali metal, e.g., sodium can be retained.

The invention is further illustrated by the following example read in conjunction with the accompanying diagrammatic drawing showing by way of an example an embodiment of a continuously working apparatus useful for carrying out the herein described process of producing alkali metal borohydrides.

*Example*

40 kg./h. of a mixture of borax and silicon dioxide (9.3 kg. of borax of a grain size of 0.1 to 0.3 mm. and 30.7 kg. of silicon dioxide of a grain size of 0.2 to 0.4 mm.) and 16.5 kg./h. of sodium metal are reacted in a continuous process in a hydrogen atmosphere of 5 atm. The mixture of borax and silicon dioxide is fed via container 1 into the storage tank 2 and therefrom in measured quantities by means of the dosing device 3 into conveyor screw 4 wherein the mixture is heated to above 250° C. The mixture is reacted in the screw conveyor 5 with sodium in the presence of hydrogen which is passed in through pipe 9. The reaction is completed in the second conveyor screw 6. The reaction is carried out at about 350° C. in screw 5 and at about 430° C. in screw 6. The reaction product, about 56 kg./h., which is discharged via containers 8 and 9, contains 11.1% of sodium borohydride, 0.5% of sodium hydride as well as sodium silicate and excess silicon dioxide. This corresponds to a conversion rate of sodium of 94% and of borax of 91% of the theoretical. Sodium borohydride can be extracted from the reaction product by means of liquid ammonia.

We claim:

1. In a process for the continuous production of an alkali metal borohydride by reacting an alkali metal borate and silicon dioxide with hydrogen and an alkali metal at elevated temperatures, the improvement which comprises in a first stage heating an alkali metal borate in admixture with silicon dioxide to a temperature of about 200–350° C., in a second stage introducing into said heated mixture of alkali metal borate and silicon dioxide an alkali metal in liquid form under a hydrogen pressure of 2–5 atmospheres, maintaining the temperature for the reaction in said second stage at about 350–400° C., thereafter in a third stage heating the resulting reaction mixture in the presence of additional hydrogen to a temperature of about 420–450° C., and thereafter recovering the alkali metal borohydride thereby formed.

2. In a process for the continuous production of an alkali metal borohydride by reacting an alkali metal borate and silicon dioxide with hydrogen and an alkali metal at elevated temperatures, the improvement which comprises in a first stage heating a melt composed of an alkali metal borate and silicon dioxide to a temperature of about 200–350° C., in a second stage introducing into said heated melt, an alkali metal in liquid form under a hydrogen pressure of 2 to 5 atmospheres, maintaining the temperature for the reaction in said second stage at about 350 to 400° C., thereafter in a third stage heating the resulting reaction mixture in the presence of additional hydrogen to a temperature of about 420 to 450° C., and thereafter recovering the alkali metal borohydride thereby formed.

References Cited by the Examiner
UNITED STATES PATENTS 2,744,810  5/1956  Jackson _____ 23—14

FOREIGN PATENTS 570,256   8/1958  Belgium.
594,414   3/1960  Canada.
1,212,817 10/1959 France.

OTHER REFERENCES

Mellor: "Comprehensive Treatise On Inorganic and Theoretical Chemistry," 1925, volume VI, pages 447–451.

OSCAR R. VERTIZ, *Primary Examiner.*

MAURICE A. BRINDISI, *Examiner.*

J. O. THOMAS, M. WEISSMAN, *Assistant Examiners.*